(12) United States Patent
Amato

(10) Patent No.: US 10,881,987 B2
(45) Date of Patent: Jan. 5, 2021

(54) VORTEX RESERVOIR

(71) Applicant: Eric Amato, Orange, MA (US)

(72) Inventor: Eric Amato, Orange, MA (US)

( * ) Notice: Subject to any disclaimer, the term of this patent is extended or adjusted under 35 U.S.C. 154(b) by 0 days.

(21) Appl. No.: 16/440,524

(22) Filed: Jun. 13, 2019

(65) Prior Publication Data

US 2020/0009477 A1 Jan. 9, 2020

Related U.S. Application Data

(60) Provisional application No. 62/694,585, filed on Jul. 6, 2018.

(51) Int. Cl.
| | | |
|---|---|---|
| *B01D 19/00* | (2006.01) | |
| *F15B 1/26* | (2006.01) | |
| *B04C 5/04* | (2006.01) | |
| *B04C 5/081* | (2006.01) | |
| *F15B 21/047* | (2019.01) | |
| *B62D 5/06* | (2006.01) | |

(52) U.S. Cl.
CPC ............ *B01D 19/0057* (2013.01); *B04C 5/04* (2013.01); *B04C 5/081* (2013.01); *F15B 1/26* (2013.01); *F15B 21/047* (2013.01); *B62D 5/062* (2013.01)

(58) Field of Classification Search
None
See application file for complete search history.

(56) References Cited

U.S. PATENT DOCUMENTS

| | | | |
|---|---|---|---|
| 5,918,760 A | 7/1999 | Frodin et al. | |
| 6,220,283 B1 | 4/2001 | Saarinen et al. | |
| 6,286,545 B1 * | 9/2001 | Moy | B01D 29/15 |
| | | | 137/574 |
| 6,311,724 B1 | 11/2001 | Tracey et al. | |
| 6,382,245 B1 | 5/2002 | Ito | |
| 6,913,040 B2 | 7/2005 | Crossman et al. | |
| 7,261,123 B2 | 8/2007 | Kim | |
| 8,038,878 B2 | 10/2011 | Hewkin | |
| 8,602,247 B2 | 12/2013 | Smirra | |
| 9,981,208 B2 | 5/2018 | Doll | |
| 2001/0054445 A1 * | 12/2001 | Evanovich | B29C 41/06 |
| | | | 137/574 |
| 2015/0075383 A1 * | 3/2015 | Doll | F15B 1/26 |
| | | | 96/207 |
| 2016/0061234 A1 * | 3/2016 | Doll | F15D 1/0005 |
| | | | 137/808 |

* cited by examiner

*Primary Examiner* — Christopher P Jones
*Assistant Examiner* — Phillip Y Shao
(74) *Attorney, Agent, or Firm* — Michael J. Nickerson; Basch & Nickerson LLP

(57) ABSTRACT

A vortex reservoir for separation of an aerated portion of a hydraulic fluid includes an upper chamber and a lower chamber, in fluid communication with the upper chamber, having a lower chamber sidewall. The lower chamber includes a lower lower chamber and an upper lower chamber. The lower chamber includes a lower chamber partitioning plate. The lower chamber partitioning plate is located between the lower lower chamber and the upper lower chamber. The lower lower chamber is in fluid communication with the upper lower chamber via a gap between the lower chamber partitioning plate and the lower chamber sidewall.

13 Claims, 4 Drawing Sheets

VORTEX RESERVOIR

PRIORITY INFORMATION

The present application claims priority, under 35 U.S.C. § 119(e), from U.S. Provisional Patent Application, Ser. No. 62/694,585, filed on Jul. 6, 2018. The entire content of U.S. Provisional Patent Application, Ser. No. 62/694,585, filed on Jul. 6, 2018, is hereby incorporated by reference.

BACKGROUND

Conventional hydraulic systems transmit energy to equipment such as linear actuating cylinders by means of a circuit of highly pressurized hydraulic fluid, typically specifically formulated oil. Such conventional systems are subject to extreme operating conditions which can cause the oil to break down prematurely, resulting in damage to hydraulic equipment. To overcome this, conventional hydraulic systems typically employ a reservoir that stores enough fluid volume to satisfy at least two minutes of system operation.

The purpose of the conventional reservoir's storage volume is to allow the oil enough time before recirculation through the pump to: (1) cool down by means of convection heat transfer through the reservoir walls; (2) dissipate trapped gas bubbles caused by cavitation and aeration; (3) allow solid particles to settle; (4) allow for thermal expansion of fluid in the system; and (5) provide makeup fluid for system equipment that may change internal volume (such as single ended hydraulic cylinders).

Compared to conventional stationary systems, conventional mobile hydraulic applications demand compact design of components as both the volume and weight of a conventional hydraulic system can have a significant impact on the overall performance and efficiency of a vehicle or piece of machinery.

Off-road vehicles used for recreation and/or competition often employ a combination of large tire sizes and extended travel suspension geometry for maximum wheel articulation, driving comfort, and vehicle capability. These factors demand higher forces to turn the wheels than would generally be required for street-driven vehicles and as a result, high pressure hydraulic and hydraulic-assist steering systems are an attractive option.

Such vehicles are generally constrained by physical size of components that must be packaged within the chassis. For example, conventional high performance steering systems may flow more than thirteen (13) gallons per minute (GPM), but the steering system may only hold one (1) quart of fluid in the reservoir and less than one (1) gallon of fluid in the entire hydraulic system. These conventional systems recirculate fluid in less than five (5) seconds, which is many times below the conventional two (2) minute rule of thumb generally accepted in the hydraulic engineering community.

Aside from heat buildup, cavitation plays a large role in the most commonly seen steering system failures. Cavitation is typically described as the formation of gas bubbles in the fluid and can be attributed to local zones of low pressure within the pump suction hose or pump internal cavities. Upon pressurization, some of these bubbles will implode causing extremely powerful microjets that can wear metallic surfaces as well as high local temperatures that degrade the fluid and reduce its ability to lubricate pump and valve internals.

With a longer recirculation time, cavitation bubbles have a chance to dissipate out of the fluid during residence time in the reservoir. However, these high performance steering systems have such short recirculation times such that bubbles do not have a chance to dissipate, often resulting in physical damage to the pump that renders the steering system inoperable.

In the automotive aftermarket for hydraulic steering systems, many manufacturers offer conventional reservoirs that are combined with screw-on filters. This conventional hydraulic steering system fails to remove gas bubbles from the fluid, and further, this conventional hydraulic steering system fails to actually circulate fluid through the reservoir canister since fluid immediately travels back to the pump after passing through the filter portion of the assembly.

This means that, depending on the total fluid capacity of the system and the volume in the reservoir canister, upwards of 25% of the total available fluid may be removed from the effective capacity of the circuit.

Another conventional reservoir is described in U.S. Pat. No. 5,918,760. The entire content of U.S. Pat. No. 5,918,760 is hereby incorporated by reference.

As disclosed in U.S. Pat. No. 5,918,760, a hydraulic reservoir is divided into an upper chamber and a lower chamber, which chambers are separated from each other by means of an annular disc having a central opening for communication between the upper and lower chambers. The annular disc is located at about half the height of the cylindrical reservoir, thus dividing the reservoir into the two chambers.

An inlet connection piece is located near the annular disc, but in the lower chamber, whereas an outlet connection piece also in the lower chamber is located close to the bottom of the reservoir. In the upper chamber, directly above the annular disc, a means for preventing fluid rotation, e.g. a wall member, is located and extends diametrically across the annular disc and extends axially at least a part of the distance towards an upper wall. The wall member then crosses a central opening in the annular disc.

A further example of a conventional reservoir 1 is shown in FIG. 1, which consists of two chambers (2 and 3) vertically separated by a horizontal baffle 4 with a single orifice 5 in the center. Fluid is introduced tangentially, through an inlet 7, into the lower chamber 3, which results in a spinning cyclone action of the fluid. The centrifugal force produced causes the heavier liquid to move outwards towards the chamber wall while the low density gas bubbles 6 migrate towards the center of the chamber and rise through the orifice 5 upwards into the headspace 2 of the reservoir.

While this conventional arrangement might be effective at removing gas bubbles entrained in returning hydraulic fluid, it has two major drawbacks in relation to high performance steering systems.

First, since the baffle plate 4 has only a single orifice 5 for release of gas bubbles into the upper chamber 2, this conventional reservoir 1 is not well suited for applications in which the liquid level is subject to sudden changes.

Such applications include actuation of single-ended hydraulic cylinders like those used in some steering systems where the reservoir needs to account for volume displacement of the cylinder shaft during extension and retraction.

The second drawback is that like the conventional reservoirs with integrated filters, there is no continuous liquid flow through the upper chamber 2 of the reservoir 1 and as such, the fluid stored in the upper chamber 2 does not provide any significant contribution to the overall effective capacity of the hydraulic circuit.

A further example of a conventional reservoir is disclosed in U.S. Pat. No. 9,981,208. The entire content of U.S. Pat. No. 9,981,208 is hereby incorporated by reference.

The conventional reservoir of Published US Patent Application Number 2015/0075383 includes a lower chamber having a generally cylindrical sidewall, a return port, and a suction port. An upper chamber is connected to the lower chamber by a neck section that places the interior volumes of the lower and upper chambers in fluid communication with one another. The neck section has a cross-sectional area taken perpendicular to a central axis of the reservoir that is smaller than a cross-sectional area of the lower chamber and the upper chamber at a different position along the central axis. The chambers and neck section may be made as a single-piece part.

U.S. Pat. No. 9,981,208 further discloses that a secondary cyclonic chamber baffle is included in the lower chamber; wherein the secondary cyclonic chamber baffle is vertically disposed along the central axis between the return port and the suction port. The secondary cyclonic chamber baffle effectively creates an upper section and lower section of the lower chambers and extends an angular distance around the sidewall of the lower chamber from vertically below the return port to vertically above the suction port to ensure that the flow path of the hydraulic fluid entering lower chamber includes at least one full cyclonic rotation around the interior volume of an upper section of the lower chamber before the hydraulic fluid flows into a lower section of the lower chamber, where the hydraulic fluid may flow to the suction port.

In summary, the various conventional reservoirs for steering systems described above fail to effectively remove gas bubbles from the fluid, to effectively account for volume displacement, and provide an effective continuous fluid flow in the reservoir.

Therefore, it is desirable to provide a reservoir system that effectively removes gas bubbles from the fluid, effectively accounts for volume displacement, and provides an effective continuous fluid flow in the reservoir.

BRIEF DESCRIPTION OF THE DRAWINGS

The drawings are only for purposes of illustrating various embodiments and are not to be construed as limiting, wherein.

DETAILED DESCRIPTION

Figure 1:
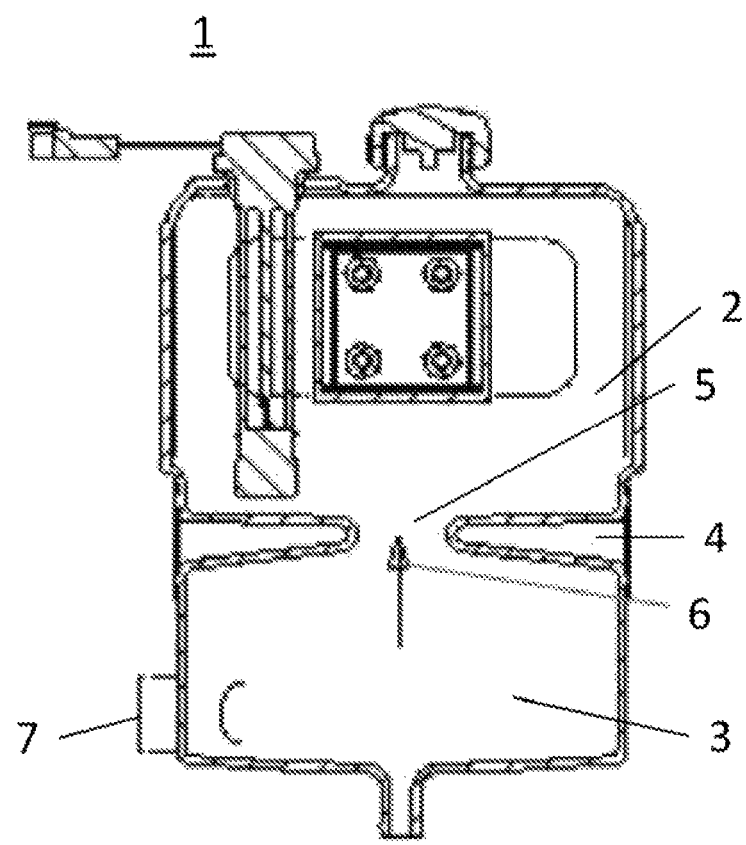
FIG. 1 shows an example of a conventional reservoir.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

Figure 2:
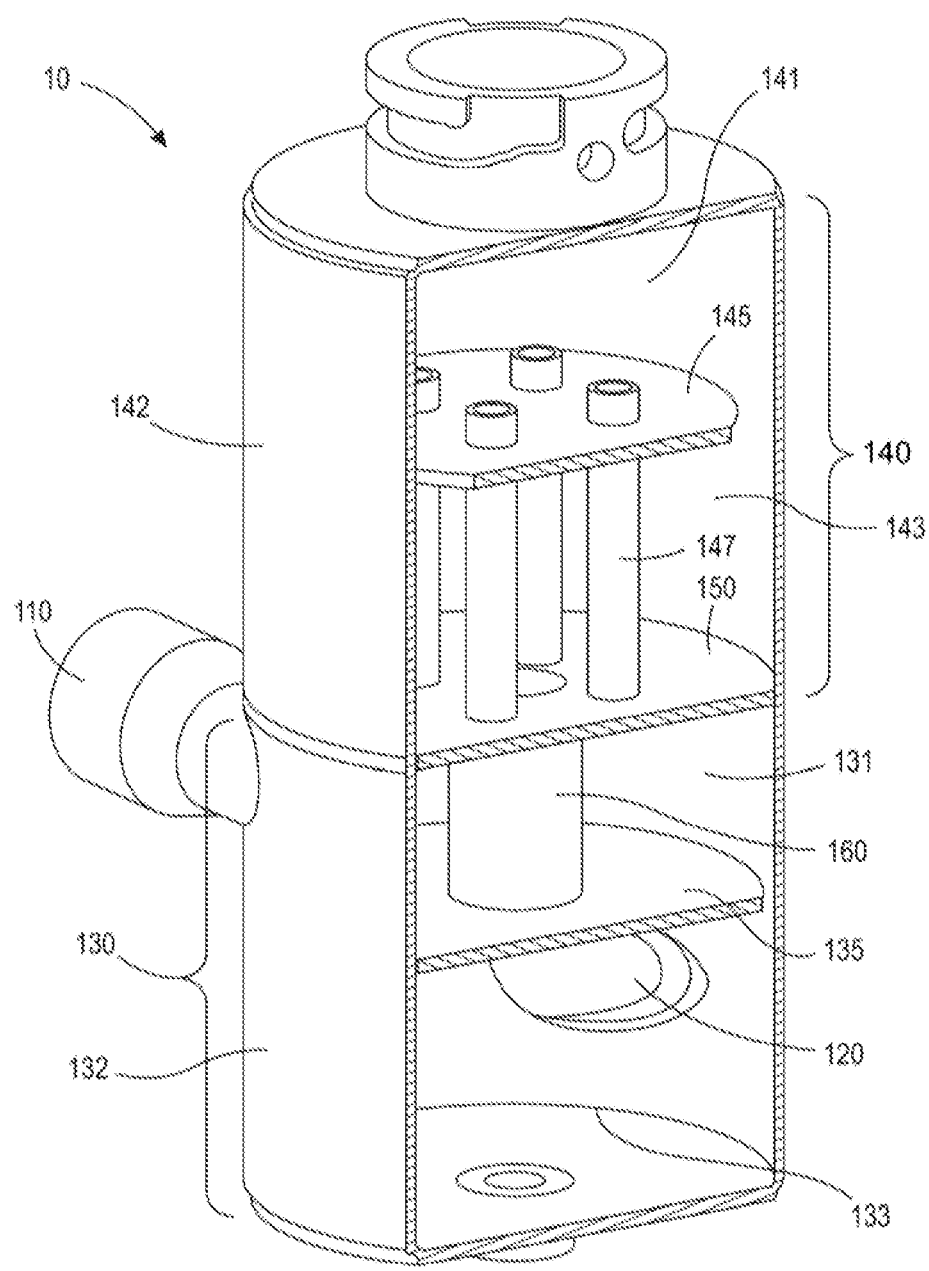
FIG. 2 shows a reservoir for removing bubbles from a hydraulic fluid and for increasing the availability of fluid in a hydraulic system in order to effectively dissipate heat from the hydraulic system.

As illustrated in FIG. 2, a hydraulic fluid reservoir 10 is divided into an upper chamber 140 and a lower chamber 130 by divider plate 150. The divider plate 150 is connected to the cylindrical sidewall 142 of the upper chamber 140 and the cylindrical sidewall 132 of the lower chamber 130 so that no fluid flows between the upper chamber 140 and the lower chamber 130 along the cylindrical sidewall 142 of the upper chamber 140 and the cylindrical sidewall 132 of the lower chamber 130.

As illustrated in FIG. 2, the lower chamber 130 is partitioned into an upper lower chamber 131 and a lower lower chamber 133 by lower chamber partitioning plate 135. The lower chamber partitioning plate 135 is not attached to the cylindrical sidewall 132 of the lower chamber 130 so that hydraulic fluid can flow between the upper lower chamber 131 and the lower lower chamber 133 along the cylindrical sidewall 132 of the lower chamber 130. The upper lower chamber 131 includes a tangential inlet 110, and the lower lower chamber 133 includes a tangential outlet 120.

It is noted that the gap between the lower chamber partitioning plate 135 and the cylindrical sidewall 132 of the lower chamber 130 allows some of the hydraulic fluid to flow directly from the upper lower chamber 131 to the lower lower chamber 133 without the fluid making a complete cyclonic rotation around the interior volume to the upper lower chamber 131 before entering the lower lower chamber 133 and subsequently exiting the lower lower chamber 133 through the tangential outlet 120.

The lower chamber partitioning plate 135 enables the containment of the air bubbles within the fluid that have migrated towards the center of the upper lower chamber 131 by only allowing flow of the concentrated liquid along the cylinder sidewall 132 to flow into the lower lower chamber 133 and producing a pressure drop that causes a portion of the fluid (the fluid with the air bubbles) to flow to the upper chamber 140 (specifically upper upper chamber 141), as will be described in more detail below.

In addition, as illustrated in FIG. 2, the upper chamber 140 is partitioned into an upper upper chamber 141 and a lower upper chamber 143 by upper chamber partitioning plate 145. The upper chamber partitioning plate 145 is not attached to the cylindrical sidewall 142 of the upper chamber 140 so that hydraulic fluid can flow between the upper upper chamber 141 and the lower upper chamber 143 along the cylindrical sidewall 142 of the lower chamber 140.

Hydraulic fluid may also flow between the upper chamber 140 and the lower chamber 130 via inter-chamber downflow fluid conduit 160. More specifically, as illustrated in FIG. 2, hydraulic fluid may flow between the lower upper chamber 143 of the upper chamber 140 and the lower lower chamber 133 of the lower chamber 130 via inter-chamber downflow fluid conduit 160.

Additionally, hydraulic fluid may also flow between the upper chamber 140 and the lower chamber 130 via inter-chamber upflow fluid conduits 147. More specifically, as illustrated in FIG. 2, hydraulic fluid may flow between the upper upper chamber 141 of the upper chamber 140 and the upper lower chamber 131 of the lower chamber 130 via inter-chamber upflow fluid conduits 147.

Figure 3:
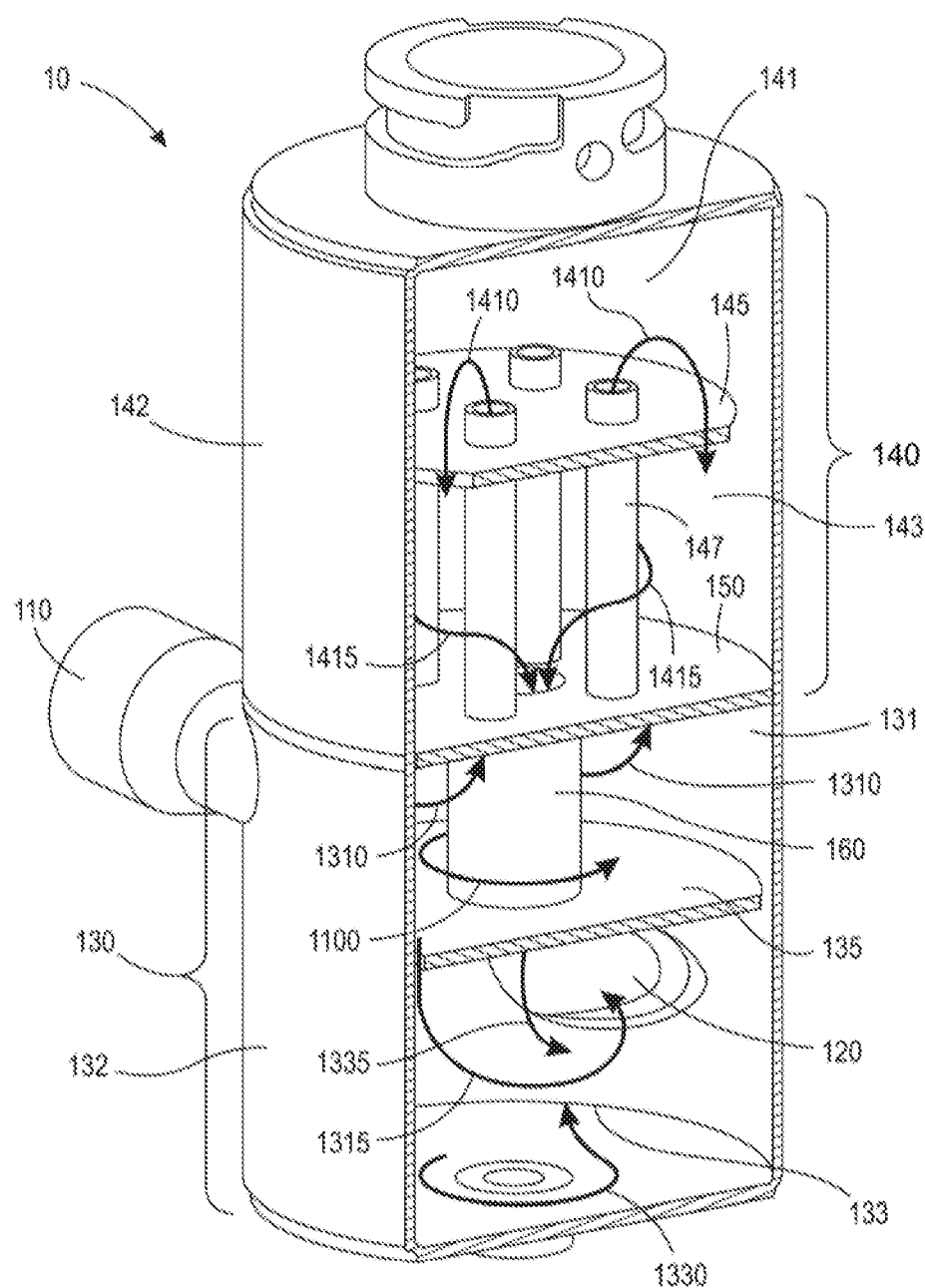
FIG. 3 shows an example of fluid flows of the reservoir illustrated in FIG. 2.

FIG. 3 illustrates the hydraulic fluid flow of the reservoir of FIG. 2. More specifically, as illustrated in FIG. 3, hydraulic fluid enters the upper lower chamber 131 of the lower chamber 130 via the tangential inlet 110 to create a cyclonic flow (arrow 1100) in the upper lower chamber 131 of the lower chamber 130.

A portion of the hydraulic fluid flows (arrow 1315) from the upper lower chamber 131 to the lower lower chamber 133 via the gap between the lower chamber partitioning plate 135 and the cylindrical sidewall 132 of the lower chamber 130. Another portion of the hydraulic fluid flows (arrows 1310) from the upper lower chamber 131 to the upper upper chamber 141 via the inter-chamber upflow fluid conduits 147.

The hydraulic fluid in the upper upper chamber 141 flows (arrows 1410) to the upper lower chamber 143 via the gap between the upper chamber partitioning plate 145 and the cylindrical sidewall 142 of the upper chamber 140.

The hydraulic fluid in the lower upper chamber 143 flows (arrows 1415 and 1335) to the lower lower chamber 133 via the inter-chamber downflow fluid conduit 160.

The hydraulic fluid in the lower lower chamber 133 flows (arrow 1330) out of the reservoir 10 via the tangential outlet 120.

Figure 4:
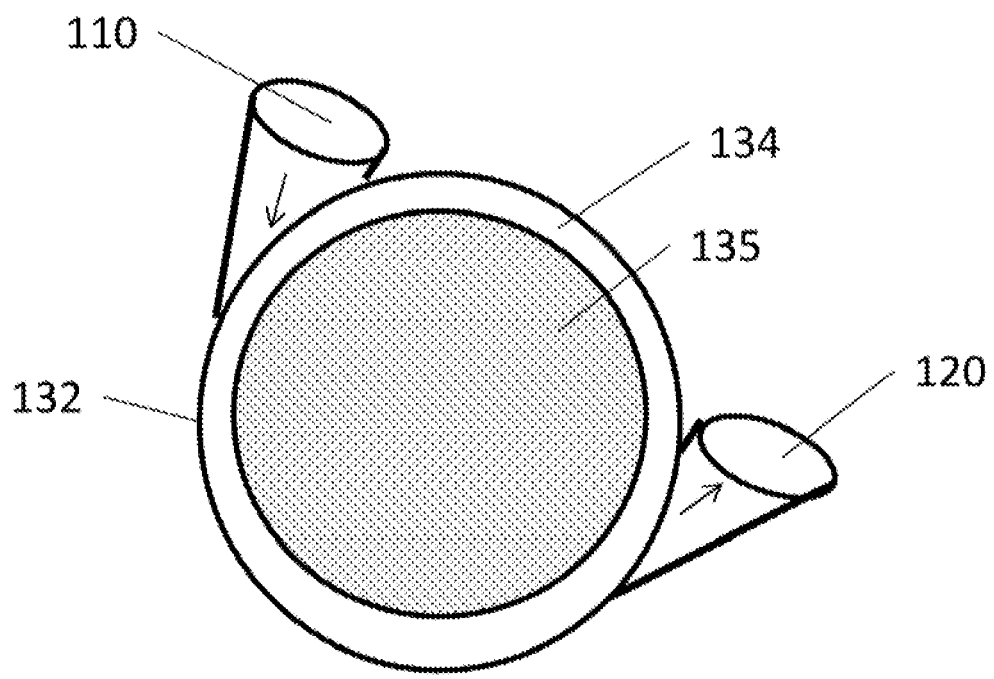
FIG. 4 is a top view of an embodiment of a lower chamber of the reservoir illustrating the gap between a lower chamber partitioning plate and a sidewall of the lower chamber.

FIG. 4 is a top view of an embodiment of a lower chamber of the reservoir illustrating a gap between a lower chamber partitioning plate and a cylindrical sidewall of the lower chamber. As illustrated in FIG. 4, the lower chamber includes lower chamber partitioning plate 135 to partition the lower chamber into an upper lower chamber and a lower lower chamber.

In this embodiment of FIG. 4, the lower chamber partitioning plate 135 does not contact the cylindrical sidewall 132 of the lower chamber, thereby forming a gap or opening 134.

The lower chamber partitioning plate 135 is not attached to the cylindrical sidewall 132 of the lower chamber so that hydraulic fluid can flow between the upper lower chamber and the lower lower chamber along the cylindrical sidewall 132 of the lower chamber. The upper lower chamber includes a tangential inlet 110, and the lower lower chamber includes a tangential outlet 120.

It is noted that the gap or opening 134 between the lower chamber partitioning plate 135 and the cylindrical sidewall 132 of the lower chamber allows some of the hydraulic fluid to flow directly from the upper lower chamber to the lower lower chamber without the fluid making a complete cyclonic rotation around the interior volume to the upper lower chamber before entering the lower lower chamber and subsequently exiting the lower lower chamber through the tangential outlet 120.

The lower chamber partitioning plate 135 also enables the containment of the air bubbles within the fluid that have migrated towards the center of the upper lower chamber by only allowing flow of the concentrated liquid along the cylinder sidewall 132 to flow into the lower lower chamber and producing a pressure drop that causes a portion of the fluid (the fluid with the air bubbles) to flow to the upper chamber, as described above.

Figure 5:
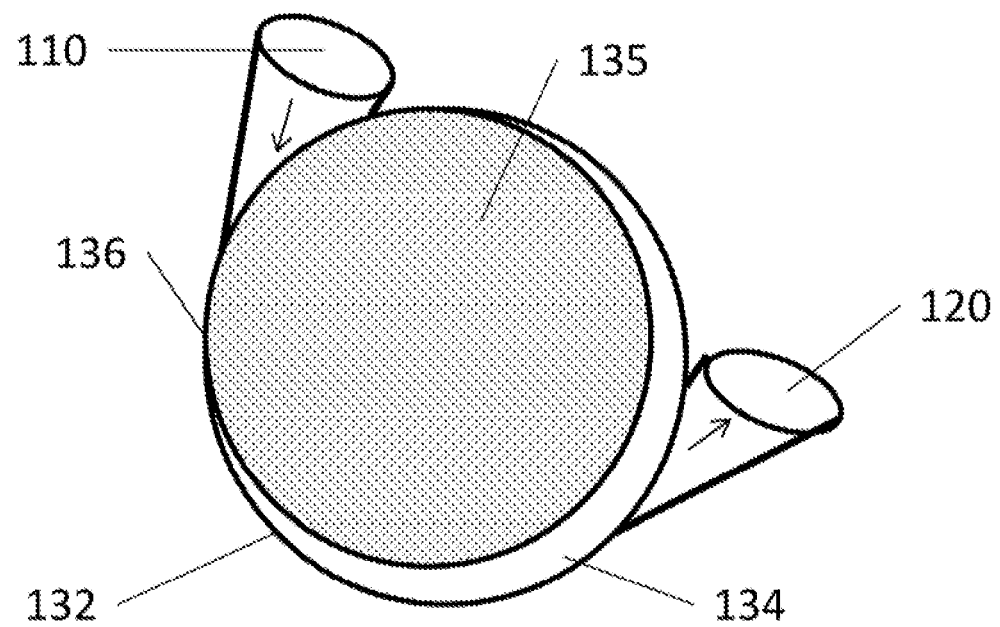
FIG. 5 is a top view of another embodiment of a lower chamber of the reservoir illustrating the gap between a lower chamber partitioning plate and a sidewall of the lower chamber.

FIG. 5 is a top view of another embodiment of a lower chamber of the reservoir illustrating a gap between a lower chamber partitioning plate and a sidewall of the lower chamber. As illustrated in FIG. 5, the lower chamber includes lower chamber partitioning plate 135 to partition the lower chamber into an upper lower chamber and a lower lower chamber.

In this embodiment of FIG. 5, the lower chamber partitioning plate 135 only contacts (136) a portion of the cylindrical sidewall 132 of the lower chamber, thereby forming a gap or opening 134.

The lower chamber partitioning plate 135 is attached (136) only to a portion of the cylindrical sidewall 132 of the lower chamber to the cylindrical sidewall 132 so that hydraulic fluid can flow between the upper lower chamber and the lower lower chamber along the cylindrical sidewall 132 of the lower chamber. The upper lower chamber includes a tangential inlet 110, and the lower lower chamber includes a tangential outlet 120.

It is noted that the gap or opening 134 between the lower chamber partitioning plate 135 and the cylindrical sidewall 132 of the lower chamber allows some of the hydraulic fluid to flow directly from the upper lower chamber to the lower lower chamber without the fluid making a complete cyclonic rotation around the interior volume to the upper lower chamber before entering the lower lower chamber and subsequently exiting the lower lower chamber through the tangential outlet 120.

The lower chamber partitioning plate 135 also enables the containment of the air bubbles within the fluid that have migrated towards the center of the upper lower chamber by only allowing flow of the concentrated liquid along the cylinder sidewall 132 to flow into the lower lower chamber and producing a pressure drop that causes a portion of the fluid (the fluid with the air bubbles) to flow to the upper chamber, as described above.

As described above, the hydraulic fluid may flow from the upper lower chamber to the lower lower chamber via the gap between the lower chamber partitioning plate and the cylindrical sidewall of the lower chamber, or the hydraulic fluid may flow from the upper lower chamber to the upper upper chamber via the inter-chamber upflow fluid conduits.

The hydraulic fluid in the upper upper chamber flows to the upper lower chamber via the gap between the upper chamber partitioning plate and the cylindrical sidewall of the upper chamber.

The hydraulic fluid in the lower upper chamber flows to the lower lower chamber via the inter-chamber downflow fluid conduit.

The hydraulic fluid in the lower lower chamber flows out of the reservoir via the tangential outlet.

The hydraulic fluid reservoir, described above, effectively increases the availability of hydraulic fluid in the hydraulic system in order to effectively dissipate heat out of the hydraulic system.

Moreover, the hydraulic fluid reservoir, described above, effectively removes gas bubbles from the hydraulic fluid.

In addition, the hydraulic fluid reservoir, described above, includes 100% of reservoir capacity in the flow path of the hydraulic system, and the hydraulic fluid reservoir, described above, can effectively accommodate for sudden changes in reservoir fill height.

Furthermore, the hydraulic fluid reservoir, described above, effectively maintains completely flooded pump suction at extreme off-camber operating angles.

With respect to the hydraulic fluid reservoir, described above, returning hydraulic fluid, which may contain gas bubbles, enters tangentially near the top of the upper lower chamber. High speed rotation of the hydraulic fluid within the upper lower chamber produces centrifugal forces that accelerate the separation of gas and liquid.

The hydraulic fluid is forced outward to the walls of upper lower chamber and flows down to lower lower chamber through a narrow annular gap between the outer diameter of the lower chamber partition plate and inner diameter of the chamber.

In addition, the hydraulic fluid reservoir is configured to contain air bubbles that have migrated towards the center of the upper lower chamber.

The narrow annular gap between the upper lower chamber and the lower lower chamber produces a pressure drop which causes some hydraulic fluid in the upper lower chamber to flow up to the upper upper chamber through a series of inter-chamber upflow fluid conduits, along with the gas bubbles from the incoming hydraulic fluid, which have migrated towards the center of the upper lower chamber.

Flow velocities in the upper upper chamber are relatively low, allowing the concentrated gas bubbles to effectively dissipate into the headspace of the reservoir.

The hydraulic fluid in the lower upper chamber, which has now been suitably de-gassed from the upper upper chamber then flows through the inter-chamber downflow fluid conduit along the axis of the reservoir to the lower lower chamber.

The hydraulic fluid exits lower lower chamber tangentially to supply the pump suction.

Although the various embodiments discussed above were described in the context of a hydraulic fluid system for a steering system, the configuration of the reservoir can be utilized in the various hydraulic fluid systems.

Moreover, although the various embodiments discussed above were described in the context of a hydraulic fluid system for a steering system, the configuration of the reservoir can be utilized in in a fluid system utilizing or needing a gas-liquid separation process; for example, the degassing of waste water.

More specifically, the various embodiments discussed above provide a reservoir for providing gas-liquid separation in a fluid system.

In summary, a vortex reservoir for separation of an aerated portion of a hydraulic fluid, comprises an upper chamber and a lower chamber, in fluid communication with the upper chamber, having a lower chamber sidewall; the lower chamber including a lower lower chamber and an upper lower chamber; the lower chamber including a lower chamber partitioning plate; the lower chamber partitioning plate being located between the lower lower chamber and the upper lower chamber; the lower lower chamber being in fluid communication with the upper lower chamber via a gap between the lower chamber partitioning plate and the lower chamber sidewall.

The gap may be continuous between the lower chamber partitioning plate and the lower chamber sidewall such that the lower chamber partitioning plate does not contact the lower chamber sidewall.

The gap may be non-continuous between the lower chamber partitioning plate and the lower chamber sidewall such that only a portion of the lower chamber partitioning plate contacts a portion of the lower chamber sidewall.

The lower lower chamber may include an outlet.

The upper lower chamber may include an inlet.

The upper lower chamber may include a tangential inlet.

The upper chamber may include a lower upper chamber and an upper upper chamber; the upper chamber including a upper chamber sidewall; the upper chamber including an upper chamber partitioning plate; the upper chamber partitioning plate being located between the lower upper chamber and the upper upper chamber; the lower upper chamber being in fluid communication with the upper upper chamber via a gap between the upper chamber partitioning plate and the upper chamber sidewall.

The vortex reservoir may include an inter-chamber downflow fluid conduit to provide fluid communication between the lower upper chamber and the lower lower chamber.

The vortex reservoir may include inter-chamber upflow fluid conduits to provide fluid communication between the upper upper chamber and the upper lower chamber.

The inter-chamber upflow fluid conduits enables air bubbles in the hydraulic fluid to flow from the upper lower chamber to the upper upper chamber.

The gap may enable hydraulic fluid flow directly from the upper lower chamber to the lower lower chamber without the hydraulic fluid making a complete cyclonic rotation around an interior volume to the upper lower chamber before entering the lower lower chamber.

It will be appreciated that several of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above.

What is claimed is:

1. A vortex reservoir for separation of an aerated portion of a hydraulic fluid, comprising:
   an upper chamber; and
   a lower chamber, in fluid communication with said upper chamber, having a lower chamber sidewall;
   said lower chamber including a lower lower chamber and an upper lower chamber;
   said lower chamber including a lower chamber partitioning plate;
   said lower chamber partitioning plate being located between said lower lower chamber and said upper lower chamber;
   said lower lower chamber being in fluid communication with said upper lower chamber via a gap between said lower chamber partitioning plate and said lower chamber sidewall;
   said upper chamber including a lower upper chamber and an upper upper chamber;
   said upper chamber including an upper chamber sidewall;
   said upper chamber including an upper chamber partitioning plate;
   said upper chamber including a gap between said upper chamber partitioning plate and said upper chamber sidewall;
   said upper chamber partitioning plate being located between said lower upper chamber and said upper upper chamber;
   said lower upper chamber being in fluid communication with said upper upper chamber via said gap between said upper chamber partitioning plate and said upper chamber sidewall.

2. The vortex reservoir as claimed in claim 1, wherein said gap between said lower chamber partitioning plate and said lower chamber sidewall is non-continuous between said lower chamber partitioning plate and said lower chamber sidewall such that only a portion of said lower chamber partitioning plate contacts a portion of said lower chamber sidewall.

3. The vortex reservoir as claimed in claim 1, wherein said lower lower chamber includes an outlet.

4. The vortex reservoir as claimed in claim 1, wherein said upper lower chamber includes a tangential inlet.

5. The vortex reservoir as claimed in claim 1, further comprising:
   an inter-chamber downflow fluid conduit, passing through said upper lower chamber, to provide direct fluid communication between said lower upper chamber and said lower lower chamber.

6. The vortex reservoir as claimed in claim 1, further comprising:

inter-chamber upflow fluid conduits, passing through said lower upper chamber, to provide direct fluid communication between said upper upper chamber and said upper lower chamber.

7. The vortex reservoir as claimed in claim 5, further comprising:
inter-chamber upflow fluid conduits, passing through said lower upper chamber, to provide direct fluid communication between said upper upper chamber and said upper lower chamber.

8. The vortex reservoir as claimed in claim 1, wherein said gap between said lower chamber partitioning plate and said lower chamber sidewall is continuous between said lower chamber partitioning plate and said lower chamber sidewall such that no portion of said lower chamber partitioning plate contacts said lower chamber sidewall.

9. The vortex reservoir as claimed in claim 8, wherein said lower lower chamber includes an outlet.

10. The vortex reservoir as claimed in claim 8, wherein said upper lower chamber includes a tangential inlet.

11. The vortex reservoir as claimed in claim 8, further comprising:
an inter-chamber downflow fluid conduit, passing through said upper lower chamber, to provide direct fluid communication between said lower upper chamber and said lower lower chamber.

12. The vortex reservoir as claimed in claim 8, further comprising:
inter-chamber upflow fluid conduits, passing through said lower upper chamber, to provide direct fluid communication between said upper upper chamber and said upper lower chamber.

13. The vortex reservoir as claimed in claim 11, further comprising:
inter-chamber upflow fluid conduits, passing through said lower upper chamber, to provide direct fluid communication between said upper upper chamber and said upper lower chamber.

\* \* \* \* \*